United States Patent
Cohen Amar

(10) Patent No.: US 7,398,602 B2
(45) Date of Patent: Jul. 15, 2008

(54) PRECISION DENDROMETER

(75) Inventor: Moshe Cohen Amar, Barcelona (ES)

(73) Assignee: Verdtech Nuevo Campo, S.A., Barcelona (ES)

( * ) Notice: Subject to any disclaimer, the term of this patent is extended or adjusted under 35 U.S.C. 154(b) by 0 days.

(21) Appl. No.: 10/531,312

(22) PCT Filed: Oct. 15, 2002

(86) PCT No.: PCT/ES02/00487

§ 371 (c)(1), (2), (4) Date: Sep. 29, 2005

(87) PCT Pub. No.: WO2004/036143

PCT Pub. Date: Apr. 29, 2004

(65) Prior Publication Data

US 2006/0123647 A1    Jun. 15, 2006

(51) Int. Cl.
G01B 3/20 (2006.01)
(52) U.S. Cl. ................................. 33/501.6; 33/555.1
(58) Field of Classification Search ............. 33/501.6, 33/755, 756, 758–759, 511, 512, 514.1, 555.1, 33/555, DIG. 13; 73/760, 761, 856, 862.625, 73/862.672, 862.68
See application file for complete search history.

(56) References Cited

U.S. PATENT DOCUMENTS

| 2,191,808 | A | * | 2/1940 | Schramm ................ 33/555.4 |
| 2,365,593 | A | * | 12/1944 | Rights et al. ............. 33/501.6 |
| 2,416,664 | A | * | 2/1947 | Ruge .................. 33/DIG. 13 |
| 2,873,341 | A | * | 2/1959 | Kutsay ................ 73/862.629 |
| 2,924,019 | A | * | 2/1960 | Verner ..................... 33/557 |
| 3,937,212 | A | * | 2/1976 | Fletcher et al. .............. 33/512 |
| 4,290,311 | A | | 9/1981 | Brewer |
| 4,294,015 | A | | 10/1981 | Drouin et al. |
| 4,549,355 | A | * | 10/1985 | Sauer et al. ............. 33/DIG. 13 |
| 4,968,485 | A | * | 11/1990 | Morita .................... 422/100 |

(Continued)

FOREIGN PATENT DOCUMENTS

JP          05260851 A * 10/1993

OTHER PUBLICATIONS

"Strain gauges and load cells," RS Data Sheet, Mar. 1997 No. 232-5957, Data Pack E, RS Components.

(Continued)

Primary Examiner—Yaritza Guadalupe-McCall
(74) Attorney, Agent, or Firm—McDermott Will & Emery LLP

(57) ABSTRACT

Based on the proportion that exists between the length of a conductive material and its electrical resistance and using a Wheatstone bridge type circuit, with four resistances to which a given input voltage is applied, and when the bridge is in balance the output voltage is zero, consists of using as such resistances respective extension measurement bands, based on a grid (1) mounted on an electrically insulating support (2), in such a way that preferably two of said grids (1) are orientated in a principal direction of maximum deformation, whereas the other two (1') are in a direction at right angle to the previous one, in such a way that the dimensional variations of said bands, determined by the increase or reduction in the dimensions of the tree or plant to be controlled, create an output voltage, positive or negative, which proportionally corresponds with said measurement increase or decrease.

4 Claims, 9 Drawing Sheets

U.S. PATENT DOCUMENTS

| | | | |
|---|---|---|---|
| 5,067,246 A | * | 11/1991 | Hesske et al. ............... 33/555.4 |
| 5,774,999 A | * | 7/1998 | Smith ......................... 33/555.4 |
| 5,955,679 A | | 9/1999 | Leon |
| 6,009,631 A | * | 1/2000 | Gensler ...................... 33/555.4 |
| 6,185,833 B1 | * | 2/2001 | Bravdo et al. .......... 33/DIG. 13 |
| 6,758,098 B1 | * | 7/2004 | Nunnelee ..................... 73/760 |
| 7,207,230 B2 | * | 4/2007 | Smith et al. ................ 73/866.5 |

OTHER PUBLICATIONS

Colin H. Daly, "Basics of Strain Measurement," Oct. 2000.

* cited by examiner

PRECISION DENDROMETER

The present invention refers to a dendrometer, that is, to an apparatus for measuring the dimensions of standing trees, in the present case generalised for the measurement of any type of plant and of any of its components, whether it be the trunk, leaves, fruit, etc.

The dendrometer consists of a sensor that has to be placed in contact with the plant, a sensor holder through which the sensor remains secured against the above-mentioned plant, and electronics or a connection interface of the sensor with the corresponding measurement system.

The purpose of the invention is to obtain optimum control of the dimensional changes of the plant throughout the day, so that based on the data obtained decisions can be taken to improve yield.

BACKGROUND TO THE INVENTION

Conventionally, and to improve the yield of a plantation, only parameters external to the actual plants, basically such as climate and irrigation of the soil, were examined and considered.

However, and since some time, it is known that plants undergo contractions/dilations throughout the day, namely an increase and decrease of their diameter (in the case of the trunk or of a fruit) that is a function of its "hydric" condition, of its "stress", so that a dendrometric and permanent control of the plant allows decisions much more adapted to improving the yield to be taken, than if only parameters external to it are considered.

Evidently these dimensional changes are minimal because of which the dendrometer used must be of great precision.

One well-known and commonly used solution in this respect consists of so-called linear movement sensors, structured by means of an electromagnetic ring-shaped coil, in whose cavity a nucleus formed by a rod freely moves, that, due to the effect of the magnetic field of the coil, is kept constantly pressed against the surface of the plant, such as, for example, against the trunk of a tree, so that when this latter expands or contracts (a few microns a day), the nucleus or rod undergoes the equivalent axial movement generating a modification in the field of the coil, that can be perfectly measured and, using suitable conversion tables, transformed into a measurement of length.

Also known are sensors or dendrometers based on the use of micrometrical gauges or extension measurement bands, based in turn in the fact that in all materials that are conductors of electricity a proportion exists between the length of said conductive and its electrical resistance, so that a proportion can be obtained between the relative change of length of a conductor and the change in its electrical resistance, that allows the dimensional increase or decrease of the plant being analysed to be deduced.

In this area the U.S. Pat. No. 4,549,355 patent should be noted, in which a Wheatstone Bridge is used as a measuring element, in which four electrical resistances connected between four points or ends of the bridge are used, which is supplied at two points to produce an output voltage in the other two that must be zero when the bridge is in balance, in such a way that this outlet voltage of value zero will vary becoming positive or negative depending on whether an increase in one or other of the resistances, that form part of the Wheatstone Bridge, occurs.

This solution, perfectly valid from the theoretical viewpoint, in practice presents problems arising from the geometry of the plant, so that the orientation in the deformation of the plant is usually neither aligned with the electro-resistant element, nor does it offer a fixed angulation, because of which differences exist between the measurement taken and the real value that can become unacceptable.

DESCRIPTION OF THE INVENTION

The pressure dendrometer that the invention proposes being based on the conventional technique of using extension measurement bands connected so that they form a Wheatstone Bridge, satisfactorily and fully resolves the problems previously set out, assuring great precision in the measurements made by it.

For this purpose and more specifically extension measurement bands elaborated based on a grid and its corresponding support, but with the particularity that unidirectional, bidirectional or tridirectional bands form part or can form part of the dendrometer, specifically mounting a single grid on the same support, two grids orientated in positioned at right angles, or three grids in which two of them form opposite angles of 45 or 60° with respect to the third.

Bands of the aforementioned different types can be used as resistances in the Wheatstone Bridge, so that the different orientation of such grids allows reliable data to be obtained independently of what the orientation of deformation of the bands caused by the plant may be.

The aforementioned extension measurement bands are strategically placed wrapped in a protective layer on an aluminium sheet, of little thickness and appreciable length, with a bent section in correspondence with one of its ends, forming a part through which contact is established with the plant whose change it is required to measure, through the non-bent end this aluminium sheet is positioned onto a slot established for this purpose in a area beside a cylinder to which a connection cable is attached that has to be connected with the aluminium sheet and that at its other end is connected to an interface that is connected with the corresponding measurement system, all this forming a sensor that is complemented with an sensor holder element as a support for attachment to the corresponding plant, with the particularity that said sensor holder is fabricated in aluminium and has a number of rods acting as feet that at one of its ends is linked to a piece that semi-embraces the plant to be measured, while at the other end the feet pass through a part on which the cylinder pertaining to the sensor previously described remains supported and secured.

The connection interface forms a signal conditioning circuit by means of which a signal will be provided based on the measurement of the positive elongation starting from the rest position of the corresponding extension measurement band, a circuit that will be capable of working correctly within the supply range of 5.5 Vdc to 8 Vdc, without the output signal being affected by the variation of said supply within the range.

The aforementioned conditioning circuit has been designed as a load cell amplifier for extension measurement bands supplied with asymmetric exact voltage, having two basic blocks, one the extension measurement bands bridge supply, and another the amplification of the bridge measurement signal of these extension measurement bands, with the particularity that the bridge supply has to have the at the maximum setting possible, since a deviation in suspension of supply would imply a deviation in the measurement, an accurate voltage regulator based on a TL431 circuit, that is an accurate Zener regulator with a maximum error of 0.5%, being provided for that purpose, furthermore it been envisaged that at the entry of the TL431 circuit there a 5V6 zener is placed in order that the variation in supply be minimum and the error less than 0.5%.

In accordance with another of the characteristics of the invention the extension measurement bands are thermo-compensating for the material on which they are mounted (aluminium), because of which, in a range of 0° C. to 50° C. the thermal output signal is practically zero.

DESCRIPTION OF THE DRAWINGS

To supplement this description and with the aim of leading to a better understanding of the characteristics of the invention, in accordance with a preferred example of its practical embodiment, as an integral part of this description it is accompanied by a set of drawings where in an illustrative and non-limiting way, the following have been represented.

PREFERABLE EMBODIMENT OF THE INVENTION

As has previously been said, in electrically conductive materials a proportion exists between the length of the conductive and its electrical resistance, that is given by the following equation:

$$R = \rho \cdot \frac{1}{A}$$

Where R is the resistance, (ρ is the resistivity, I is the length and A is the section.

Consequently, on deforming the conductor, changing its length, provided this deformation remains within the elastic range, and no change in the resistivity of the conductor is introduced, the change of electrical resistance is a function of the deformation, according to the relation:

$$\frac{\Delta R}{R} = F\left(\frac{\Delta l}{l}\right)$$

Figure 1:
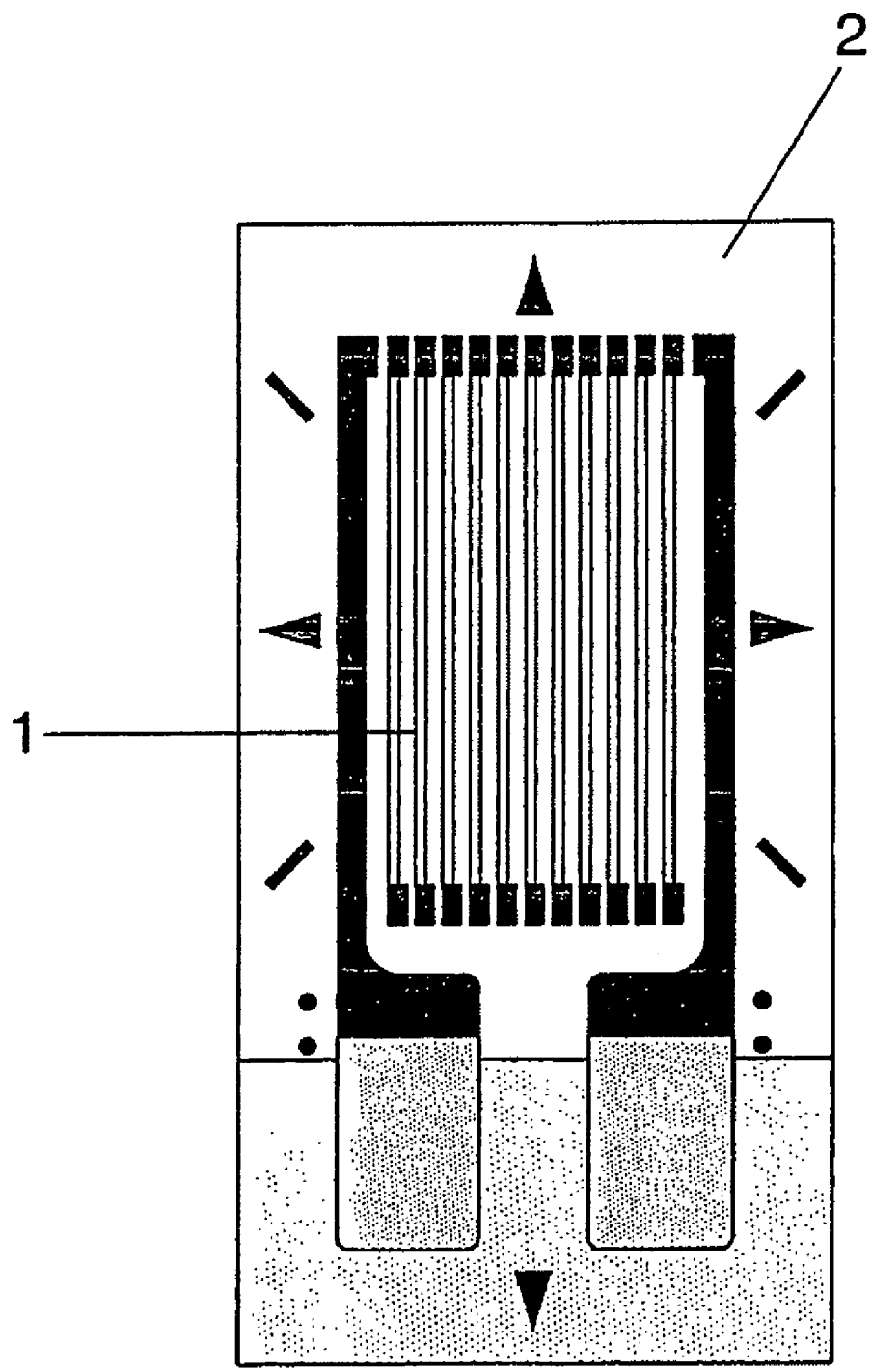
FIG. 1.—Shows an schematic representation of a unidirectional extension measurement band.

As is observed in FIG. 1, an extension measurement band is formed by means of a grid (1) positioned in a support (2), a grid that forms the sensitive part for the deformation, and that must have the following characteristics:

Linearity in sensitivity to deformation in the elastic range, which implies accuracy and repeatability.

High resistivity in order that it be of small size.

High sensibility to deformation in order to obtain the largest possible signal at a given level of deformation.

Temperature adjustable coefficient of resistance, for compensation with optimum temperature.

Wide range of operating temperature.

Long fatigue life, for the case of dynamic phenomena.

Different alloys, such as for example those of copper-nickel, chromium-molibdenum-iron, nickel-chromium or platinum-tugsten, meet these characteristics.

For its part the support (2) must offer the following basic functions:

Firm support for the grid, terminals and cables.

Provide a surface prepared for the bonding of the band onto the test surface.

Electrically insulate the specimen band.

Faithfully transmit to the grid, through the adhesive, the deformations arising in the material.

High shear modulus, with minimum thickness, to assure perfect transmission of deformations.

Resistance and flexibility, to reduce the possibility of damage during installation and to allow its use in curved areas.

High elongation capacity, for its use in deformation levels within the plastic range of the majority of materials.

Adherence facility, in order to have strong resistance to becoming detached from the test material and to assure attachment with the grid.

Inherent and high insulation resistance, to eliminate problems and inaccuracies in measurements.

Good stability with the minimum creep.

Capable of maintaining the previous characteristics in the greatest range of temperatures possible.

Materials that meet the previously outlined characteristics are polyamide, simple or laminated, and epoxy or phenolic type resins.

The alloys used for the manufacture of bands must have, as the most important characteristic, sensitivity to deformation. A relation exists between the variation of resistance and the applied deformation that is defined as the band factor (K).

The fact that the grid is formed by thin wire implies that it has a certain sensitivity of response to transverse deformations, especially in the areas of the loops, where there is a finite quantity of wire transversely orientated with respect to the measurement axes of the grid, as is seen in FIG. 1. This effect is less in the bands with perpendicular section grid, but nonetheless they are inherently affected, especially if it is taken into account that every wire of the grid is sufficiently big to reflect a transverse deformation induced by the support.

The nature and range of the consequent resistive change depends on the particular characteristics of the sensitive alloy that is used.

The fact that the extension measurement band is a resistance implies that it will become affected by the temperature variations, which obliges a compensation to minimize such an effect to be made.

Evidently the ideal solution is that in which the apparent distortion of the temperature is equal to zero, for which there the use of temperature auto-compensating bands has been envisaged.

Figure 2:
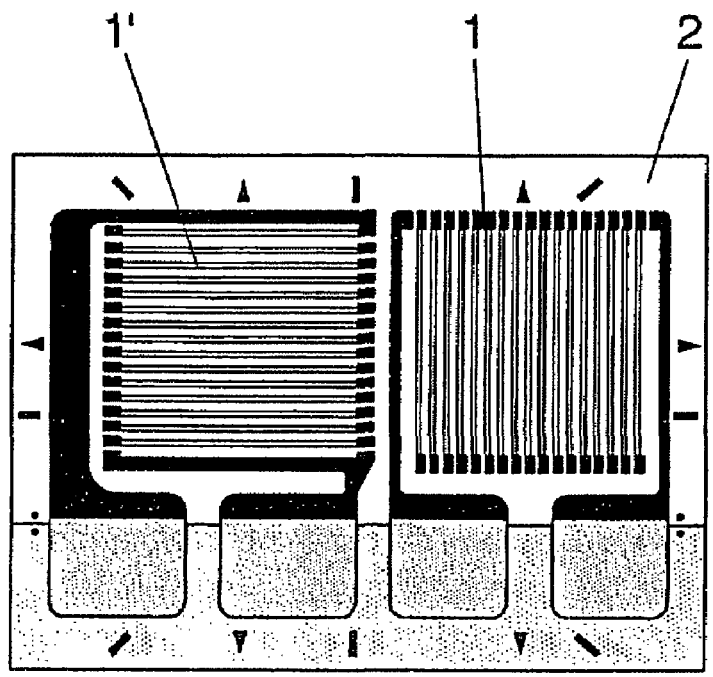
FIG. 2.—Shows a bidirectional extension measurement band, in accordance with a similar representaion to that of the previous figure.

The bands can be unidirectional, as that shown one in FIG. 1, that allow the condition of deformations and/or voltages of the structure onto which they are bonded to be known, according to the longitudinal axis of the band, but equally they can be bidirectional, such as that shown in FIG. 2, where two grids (1) (1') are mounted on the same support (2), with their orientations at a 90° angle with respect to each other, as is also seen in the aforementioned FIG. 2. This type of band is used when the principal directions are known and what is of interest is to know the (principal) maximum and minimum deformations and/or voltages of a structure under load, of course at the point of installation of the band.

Figure 3:
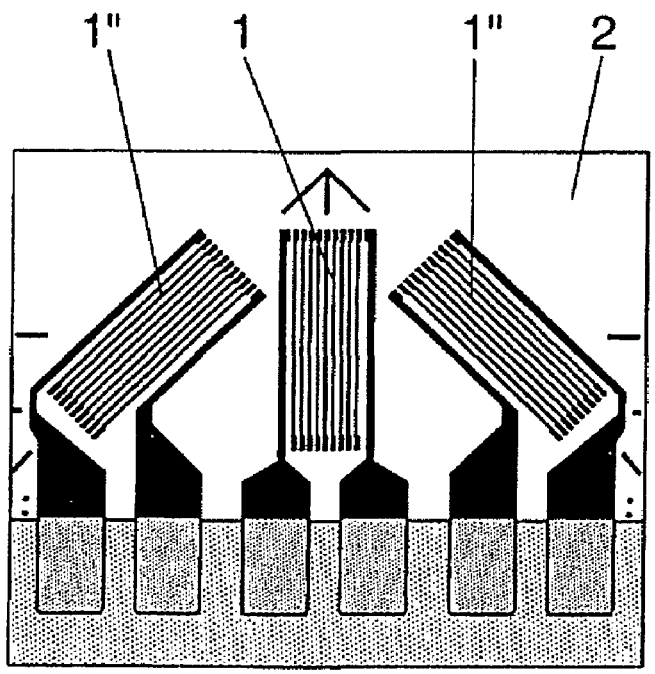
FIG. 3.—In turn shows an tridirectional extension measurement band.

There also exists the possibility of using tridirectional bands such as that shown in FIG. 3, in which a grid (1) is intermediately mounted in the lateral grids (1") on the support (2), orientated at 45 or 60° with respect to the first one, and with their orientations opposite each other, a band applicable in structures with unclear symmetries or subjected to combined loads, where it is necessary to know the deformation in three directions.

Figure 4:
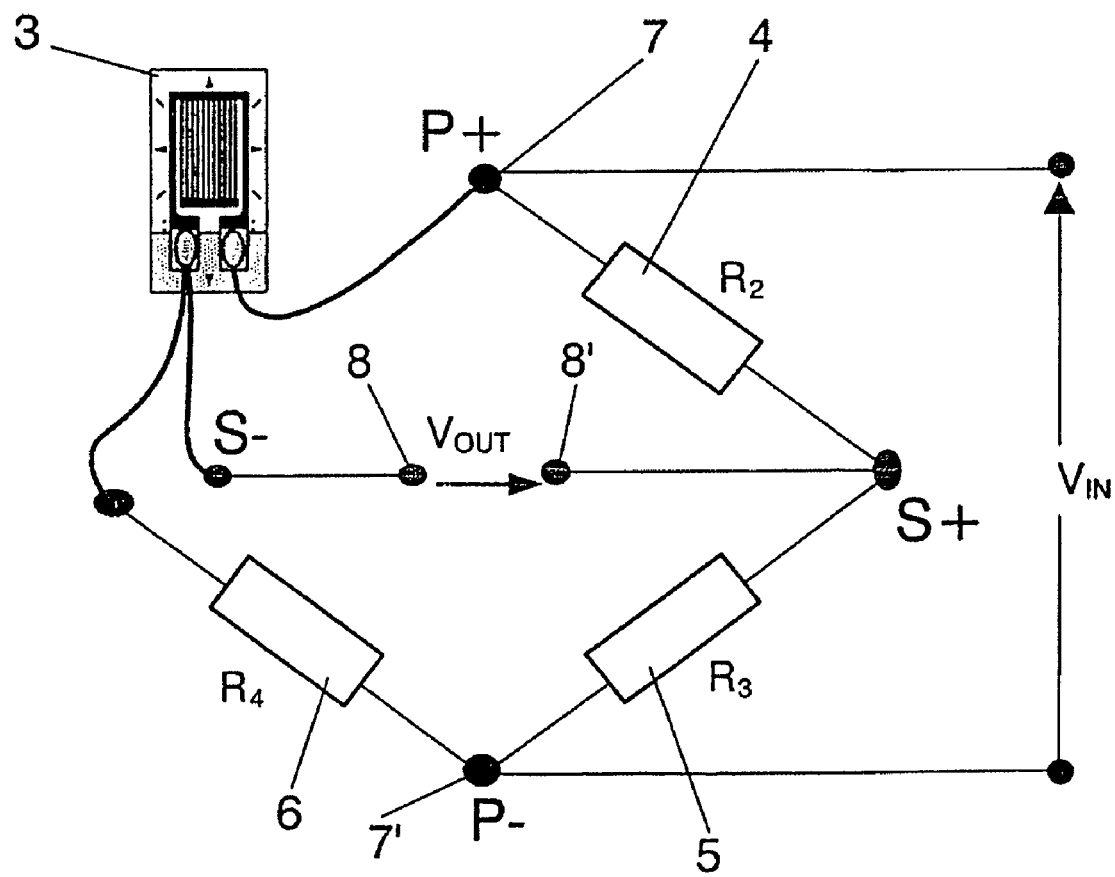
FIG. 4.—Shows the scheme corresponding to the simplest assembly of the dendrometer bridge, specifically a three-wire assembly in which only one extension measurement band participates.

In FIG. 4 one of the bands previously mentioned, specifically the simple extension measurement band of FIG. 1, has been shown, universally referenced (3), forming part of a Wheatstone bridge, as the first of its resistances, combined with three conventional resistances, (4), (5) and (6), giving rise to a three-wire assembly that guarantees the symmetry of the circuit, supplied by a given incoming voltage applied in the nodes (7), (7'), and with an output voltage between the points (8) (8') that must be zero when the bridge is balanced, adopting a positive or negative value according to the deformations undergone by the extension measurement band (3).

With this three-wire assembly not only the symmetry of the circuit is guaranteed, but also, as a consequence, the effect of the cable resistance is eliminated, as well as the effect that change of temperature has on the resistance of the cables, effects of signal "desensitization" also being avoided. This is achieved if all the cables are of the same length and, if possible, joined or twisted, in order to be thus subjected to the same environmental conditions.

In this type of assembly only one active branch exists, because of which the ratio between the incoming voltages and output is ¼ of the band factor (K) multiplied by the deformation of the material.

Also a mid-bridge assembly is possible, placing two extension measurement bands (3) in adjacent or opposite branches of the Wheatstone Bridge shown in FIG. 4. If the bands (3) are placed in the adjacent branches, one of them must work in traction and the other in compression, in order that if the resistance increases in one it decreases in the other. Anther possibility is that one of the two presents zero deformation, that due to its positioning it operates at minimum deformation or to measure the Poisson effect.

Adjacent branch mounting is a very useful mounting when it is intended to compensate temperature beyond, above or below the auto-compensation range of the bands. In this way a band bonded onto the test structure that is measuring mechanical deformations, and those due to the thermal signal of the bands, can be had. In the adjacent branch another band, which is denominated compensation, is placed bonded onto that same material, and subjected to the same environmental conditions as the active band, but without undergoing mechanical deformations. In this way, subtracting the signal of two bands, subtracts only the deformation due to mechanical effects. Nevertheless, it is very difficult to maintain complete symmetry and that two bands are exactly at the same temperature and have the same resistance.

In case of two active branches, both in accordance with the principal direction of deformation, the output signal is ½ of the band factor (K) multiplied by the deformation of the material.

Finally there also exists the possibility of carrying out a full bridge assembly, a case in which extension measurement bands (3) are used in all the branches of the bridge, a solution that allows a greater sensitivity in the measurement system to be obtained. Logically when four extension measurement bands orientated in accordance with the principal direction are used, that is, when all the branches are active, the ratio between the incoming and output voltages is equal to the product of the band factor (K) by the deformation of the material.

In this case the signal is multiplied by four with respect to the quarter bridge assembly, in addition to automatic compensation with the temperature and the elimination of undesirable signals, that is, noise.

Furthermore there exists the possibility of obtaining other numbers of active branches, not whole, specifically with values 1,3 and 2,6, depending how the bands are arranged in the bridge, it being possible to obtain different output signals substituting this value of the number of bands in the corresponding output equation.

The main advantage of the full bridge is that all of the wiring, from the point of measurement to the instrumentation, including connectors, jacks and, if they are in use, brush rings, are outside the measurement circuit, because of which the errors that they might introduce in the system are minimum.

In accordance with what has previously been set out, in the quarter bridge mounting solution the use of auto-compensating bands is essential to obtain a measurement without alterations due to temperature effects, or with tabulated alterations, whereas in the cases of half bridge and full bridge temperature compensation can be automatically achieved, in the absence of auto-compensating bands.

Figure 5:
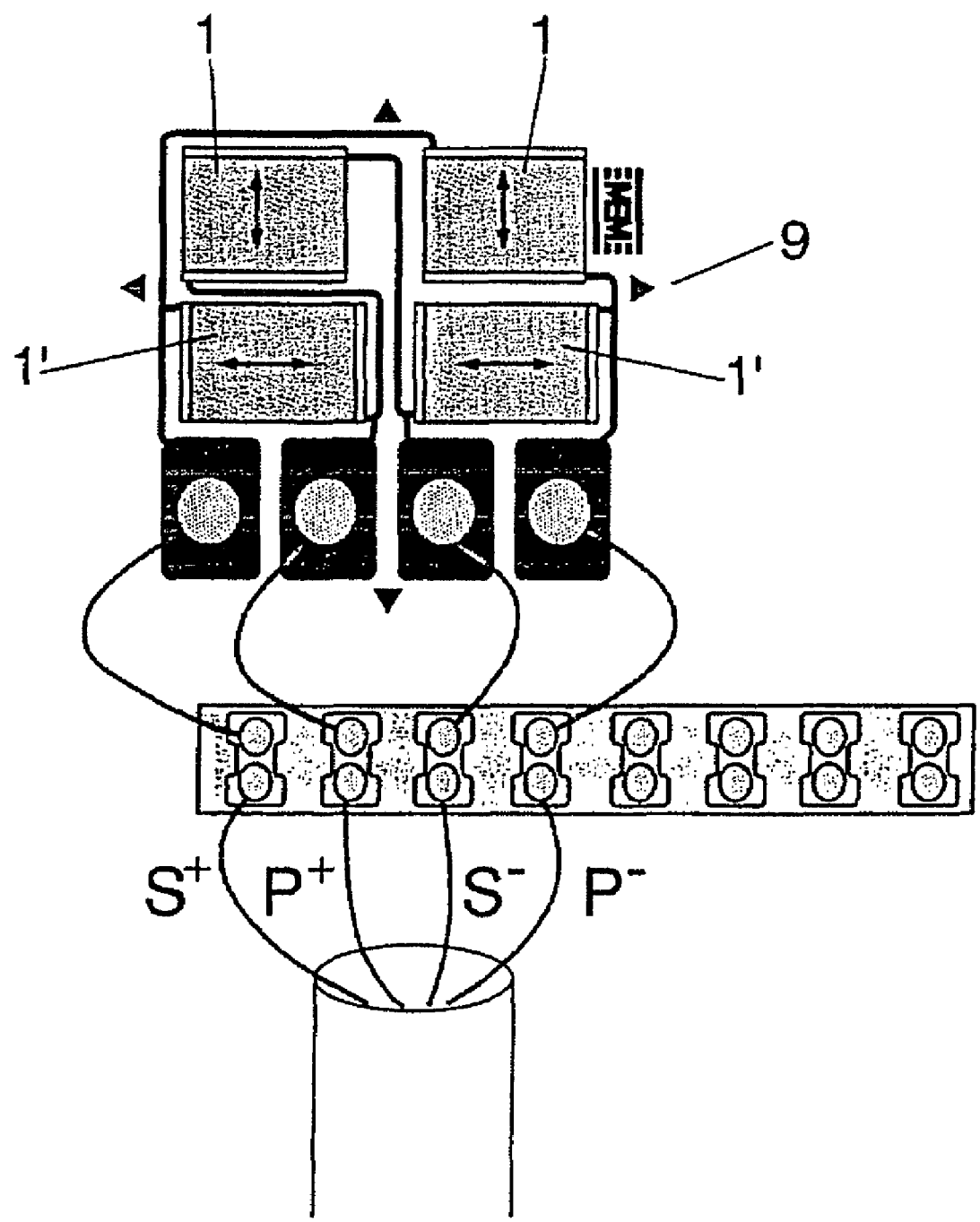
FIG. 5.—Shows the manner of wiring of a sensor with "full bridge" assembly, on one face, with two extension measurement bands at right angles to the other two.
Figure 6:
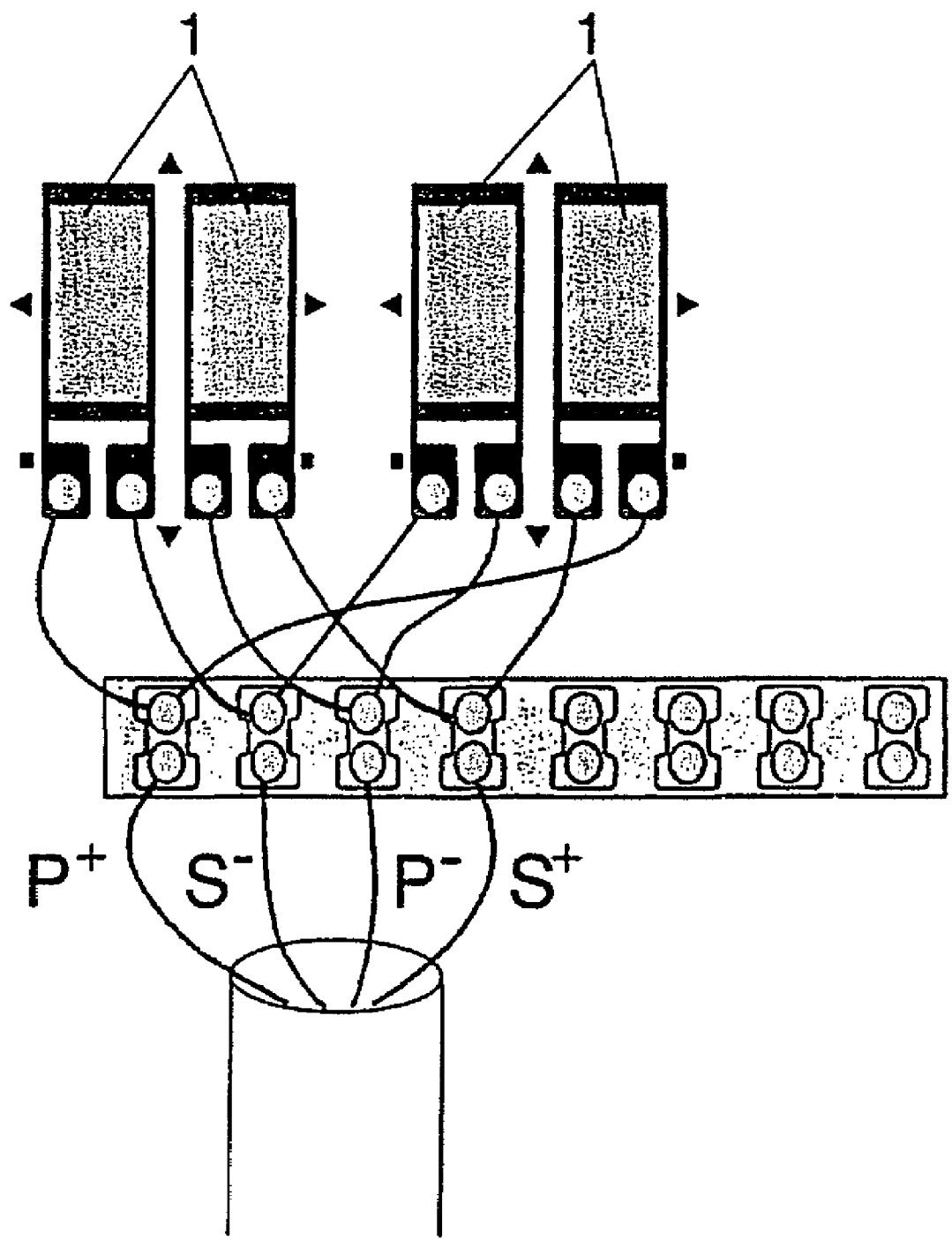
FIG. 6.—Shows a representation similar to the previous figure but corresponding to a two-sided sensor.

In FIGS. 5 and 6 two solutions for mounting of the extension measurement bands in the dendrometer of the invention have been shown.

In case of FIG. 5, in the assembly (9), on one face, a full bridge assembly is performed, with two grids (1) in accordance with the principal direction of maximum deformation, and two other grids (1') in accordance with the principal direction of minimum deformation, that is perpendicular to the previous one. With a polyamide support and the grids unencapsulated a number of active branches of 2,6, are obtained.

This band is installed only in the upper face of the sensor, leaving the lower face free.

In FIG. 6 the second type of sensor, of two sides, has been shown, so that two bands are placed on each side, the four grids (1) (two for each side) orienting in accordance with the principal deformation, with which an number of active branches of four is obtained. Also in this case a polyamide support and an unencapsulated grid is used, with nominal resistance of 350 ohms and autocompensation for aluminium.

Each band has two parallel grids that, wired with each other and with the band placed on the other side, achieve a full bridge.

Figure 7:
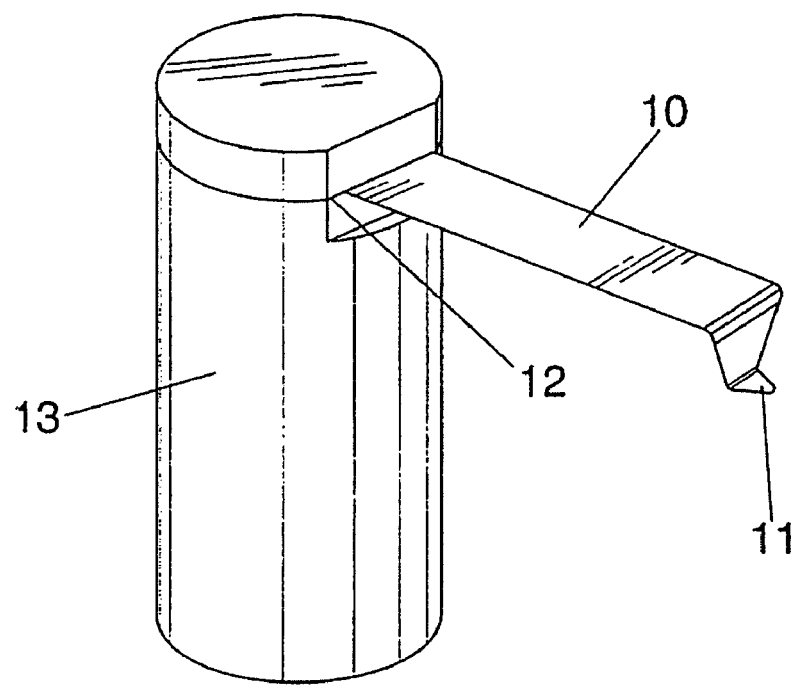
FIG. 7.—Shows a perspective representation of the sensor corresponding to the dendrometer, that is the object of the invention.
Figure 8:
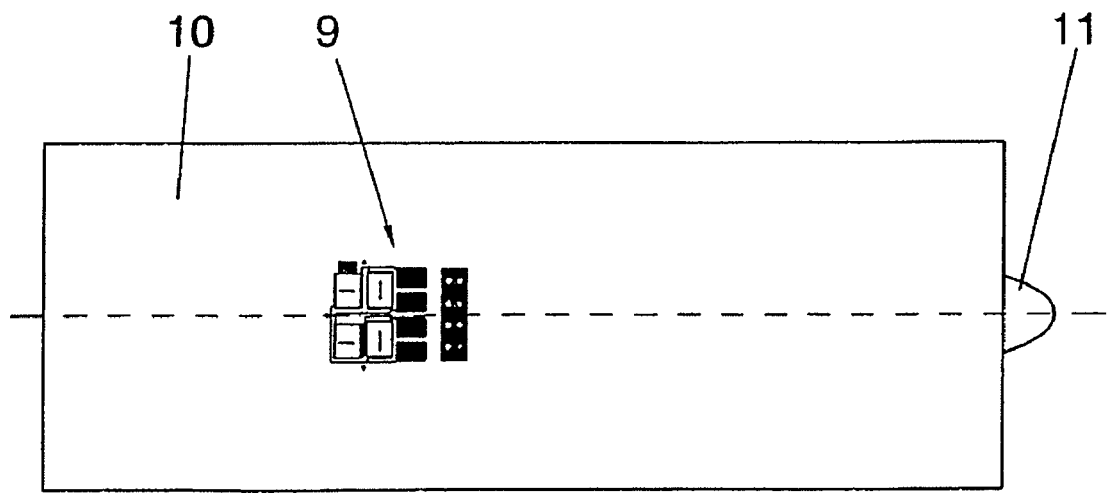
FIG. 8.—Shows a plan view of the specific mounting position of the extension measurement bands on the aluminium plate that forms part of the sensor shown in the previous figure.
Figure 9:
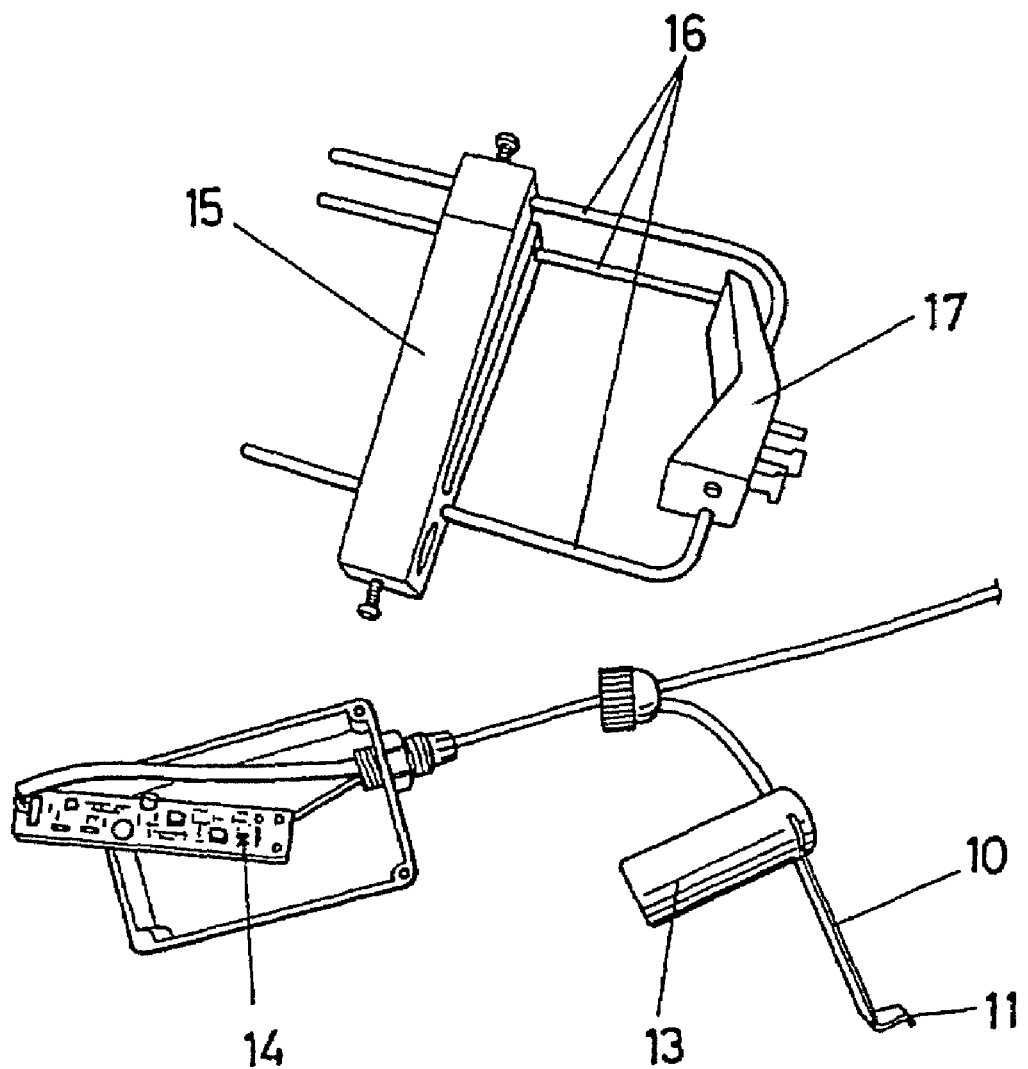
FIG. 9.—Shows a blow-up view of the sensor, of the sensor holder, which serves for securing to the corresponding plant and the interface or electronic circuit for connection to the corresponding measurement system and logically in connection with the sensor shown in the same figure.

The mounting (9) that forms the extension measurement bands is placed in a specific area of an aluminium sheet (10) of rectangular configuration and preferably of 60 mm length and 10 mm width, that at one of its ends has a double bend section with convergent lateral edges which causes that, from the first bending, the emergent part becomes narrower until terminating in an angular and rounded end (11) that is going to define the means of contact onto the corresponding plant in which the dendrometer will be applied, it having been envisaged that this aluminium sheet (10), support of the extension measurement bands previously referred to, is positioned at its opposite end in a slot (12) provided in a diametrical direction close to one of the ends of a cylindrical body (13), in accordance with is seen in FIG. 7.

The mounting referred to constitutes a sensor in connection with an electronic interface (14) that defines a circuit whose characteristics will be set out afterwards and that is connected to the corresponding measurement-taking system or equipment.

Figure 10:
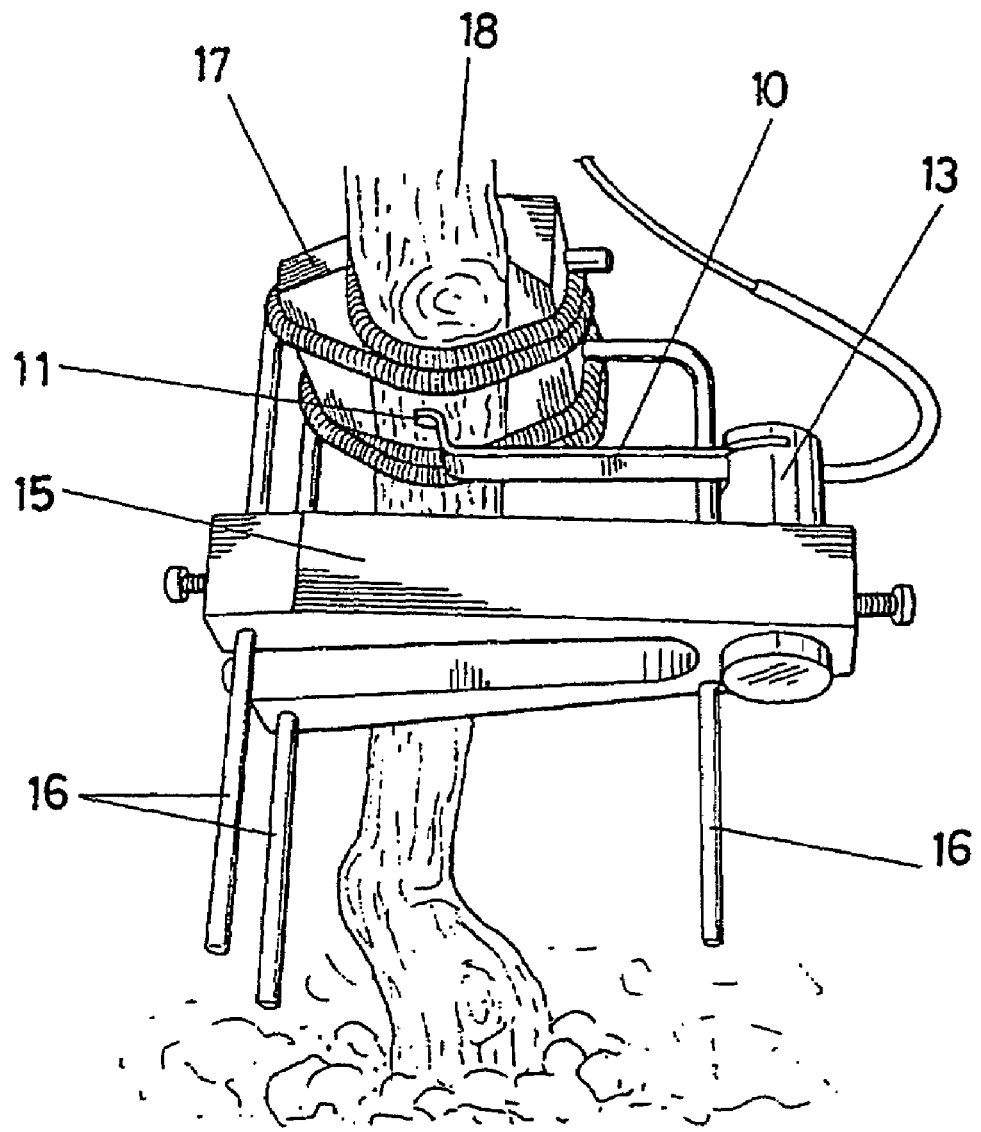
FIG. 10.—Shows a practical mounting or application on a plant of the assembly represented in the previous figure.

The sensor is mounted on a support or sensor holder (15), which has a part, corresponding with the reference (15), like a clamp with a cylindrical depression in which the sensor cylinder (13) is positioned, a number of rods (16) acting as feet being passed through the part that forms that sensor holder (15), that finish in another part (17) with tightening elements to secure them, assisted by suitable anchoring elements, onto the plant (18) in which the dendrometer is applied, as is shown in FIG. 10.

The sensor holder (15) will be fabricated in aluminium, whereas the rods corresponding to its feet (16) are fabricated from another material with zero coefficient of expansion to allow the constant variation microns of the plant (18) to be measured.

Figure 11:
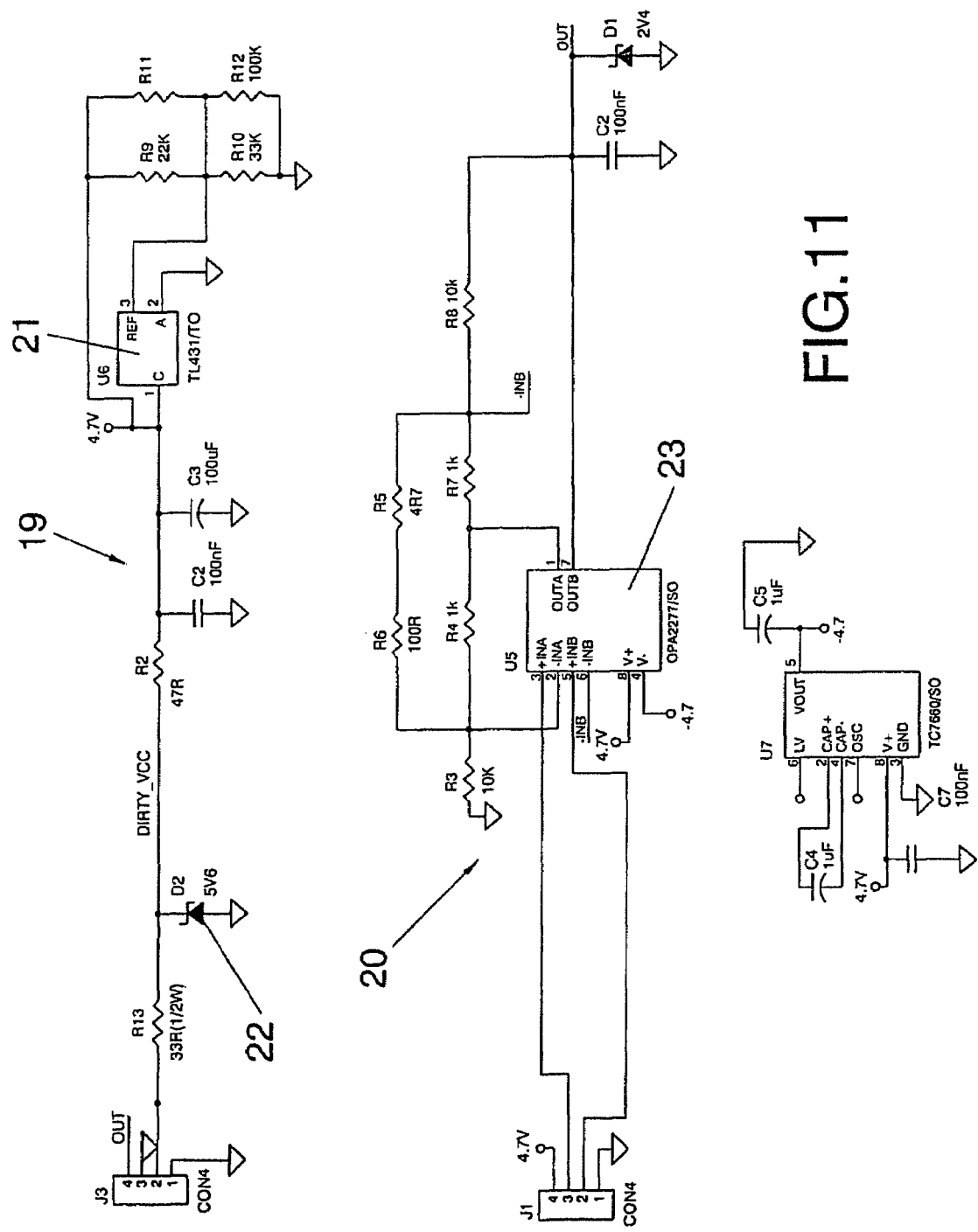
FIG. 11.—Shows, finally, the diagram corresponding to the circuit that forms the connection interface of the sensor with the corresponding measurement equipment.

In FIG. 11 the electronics interface, formed by the dendrometer assembly signal adjustment circuit, is shown, a circuit that has been designed as a load cell amplifier for extension measurement bands supplied by precision asymmetric voltage, including an extension measurement bands bridge supply block (19) and an extension measurement bands bridge measurement signal amplification block (20), with the particularity that the supply block (19) has a voltage regulator based on a TL431 circuit (21) that is an accurate Zener regulator of precision with a maximum error of 0.5%, having a 5V6 Zener (22) at the input of this block or circuit (21) in order that the variation of supply be minimum and the error less than 0.5%, the supply referred to centering in 4.7 Vcc+0.5%.

The signal amplification, whose schematic diagram corresponds to the block (20), basically includes an operational (23) OPA2277/SA of low cost and high performance, operating as a differential amplifier with a set gain, set up according to the resolution required by the application, all this in a such way that the gain of the circuit will be the amplification by which the differential signal received from the extension measurement bands is multiplied, this signal being proportional to their elongation, that gain being selected on the basis of the resolution of the reader and of the accuracy required.

Logically, in the moment that a gain and a supply voltage for the extension measurement bands bridge is established, it will be possible to define the interrelation between the output voltage of the circuit and the distance that the sensor has moved, so that the accuracy that will be obtained of the final measurement will depend on the resolution of the reading apparatus, of the gain of the circuit and of the quality of assembly.

The invention claimed is:

1. A precision dendrometer, of the type based on the use of extension measurement bands as resistances for a Wheatstone Bridge type circuit, said dendrometer comprising:
   a sensor holder that serves as a part for securing the dendrometer to a plant; and
   an electronic interface connecting the sensor holder to data collector equipment and a sensor;
   wherein said sensor comprises a cylindrical body of aluminium, the cylindrical body of aluminum coupled to a first end of an aluminium sheet on which the extension measurement bands are mounted; a second end of the aluminium sheet narrowing to an end for contacting the plant, and wherein said sensor is configured to determine a dimensional variation of the plant according to a pressure exerted by the plant.

2. The precision dendrometer of claim 1, wherein the second end of the aluminium sheet has a double bend with convergent side edges, forming a substantially angular and rounded end.

3. The precision dendrometer of claim 1, wherein the sensor holder comprises:
   a cylindrical cavity configured to hold the cylindrical body of aluminum; and
   a plurality of rods acting as feet, and at least one of the plurality of rods is coupled to a part for adjusting and securing the precision dendrometer to the plant.

4. The precision dendrometer of claim 3, wherein the plurality of rods are fabricated from material that has a zero coefficient of expansion, to allow the constant variation microns of the plant to be measured.

* * * * *